US009448630B2

(12) United States Patent
Ciesla et al.

(10) Patent No.: US 9,448,630 B2
(45) Date of Patent: *Sep. 20, 2016

(54) METHOD FOR ACTUATING A TACTILE INTERFACE LAYER (71) Applicant: Tactus Technology, Inc., Fremont, CA (US)

(72) Inventors: Craig M. Ciesla, Fremont, CA (US); Micah Yairi, Fremont, CA (US); Nathaniel Saal, Fremont, CA (US)

(73) Assignee: Tactus Technology, Inc., Hayward, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/635,304

(22) Filed: Mar. 2, 2015

(65) Prior Publication Data

US 2015/0177839 A1  Jun. 25, 2015

Related U.S. Application Data (63) Continuation of application No. 13/090,217, filed on Apr. 19, 2011, now Pat. No. 8,970,403.

(60) Provisional application No. 61/325,772, filed on Apr. 19, 2010.

(51) Int. Cl.
*H03K 17/94* (2006.01)
*G06F 3/01* (2006.01)
(Continued)

(52) U.S. Cl.
CPC .............. *G06F 3/016* (2013.01); *G06F 3/0202* (2013.01); *G06F 3/044* (2013.01); *G06F 3/0414* (2013.01); *G06F 3/04883* (2013.01); *G06F 3/04886* (2013.01); *G06F 2203/04809* (2013.01)

(58) Field of Classification Search
CPC ........................... G05G 9/047; G06F 3/0219
USPC ....................................... 340/407.2; 345/173
See application file for complete search history.

(56) References Cited

U.S. PATENT DOCUMENTS 2,885,967 A    5/1959  Vogel
3,034,628 A    5/1962  Wadey
(Continued)

FOREIGN PATENT DOCUMENTS

CN    1260525 A    7/2000
CN    1530818 A    9/2004
(Continued)

OTHER PUBLICATIONS

"Sharp Develops and Will Mass Produce New System LCD with Embedded Optical Sensors to Provide Input Capabilities Including Touch Screen and Scanner Functions," Sharp Press Release, Aug. 31, 2007, 3 pages, downloaded from the Internet at: http://sharp-world.com/corporate/news/070831.html.
(Continued)

*Primary Examiner* — Benjamin C Lee
*Assistant Examiner* — Israel Daramola
(74) *Attorney, Agent, or Firm* — Jeffrey Schox (57) ABSTRACT A method for actuating a tactile interface layer of a device that defines a surface with a deformable region, comprising the steps of deforming a deformable region of the surface into a formation tactilely distinguishable from the surface, detecting a force from the user on a deformed deformable region, interpreting the force as a command for the deformable region, and manipulating the deformable region of the surface based on the command.

21 Claims, 5 Drawing Sheets (51) Int. Cl.
  *G06F 3/041*  (2006.01)
  *G06F 3/044*  (2006.01)
  *G06F 3/0488*  (2013.01)
  *G06F 3/02*  (2006.01)

(56) References Cited

U.S. PATENT DOCUMENTS

| | | | |
|---|---|---|---|
| 3,441,111 A | 4/1969 | Spalding |
| 3,453,967 A | 7/1969 | Spurlock |
| 3,490,733 A | 1/1970 | Berthaud |
| 3,659,354 A | 5/1972 | Sutherland |
| 3,759,108 A | 9/1973 | Borom et al. |
| 3,780,236 A | 12/1973 | Gross |
| 3,818,487 A | 6/1974 | Brody et al. |
| 4,109,118 A | 8/1978 | Kley |
| 4,181,476 A | 1/1980 | Malbec |
| 4,209,819 A | 6/1980 | Seignemartin |
| 4,290,343 A | 9/1981 | Gram |
| 4,307,268 A | 12/1981 | Harper |
| 4,467,321 A | 8/1984 | Volnak |
| 4,477,700 A | 10/1984 | Balash et al. |
| 4,517,421 A | 5/1985 | Margolin |
| 4,543,000 A | 9/1985 | Hasenbalg |
| 4,584,625 A | 4/1986 | Kellogg |
| 4,700,025 A | 10/1987 | Hatayama et al. |
| 4,743,895 A | 5/1988 | Alexander |
| 4,772,205 A | 9/1988 | Chlumsky et al. |
| 4,920,343 A | 4/1990 | Schwartz |
| 4,940,734 A | 7/1990 | Ley et al. |
| 5,090,297 A | 2/1992 | Paynter |
| 5,194,852 A | 3/1993 | More et al. |
| 5,195,659 A | 3/1993 | Eiskant |
| 5,212,473 A | 5/1993 | Louis |
| 5,222,895 A | 6/1993 | Fricke |
| 5,286,199 A | 2/1994 | Kipke |
| 5,346,476 A | 9/1994 | Elson |
| 5,369,228 A | 11/1994 | Faust |
| 5,412,189 A | 5/1995 | Cragun |
| 5,459,461 A | 10/1995 | Crowley et al. |
| 5,470,212 A | 11/1995 | Pearce |
| 5,488,204 A | 1/1996 | Mead et al. |
| 5,496,174 A | 3/1996 | Garner |
| 5,666,112 A | 9/1997 | Crowley et al. |
| 5,717,423 A | 2/1998 | Parker |
| 5,729,222 A | 3/1998 | Iggulden et al. |
| 5,742,241 A | 4/1998 | Crowley et al. |
| 5,754,023 A | 5/1998 | Roston et al. |
| 5,766,013 A | 6/1998 | Vuyk Klaas |
| 5,767,839 A | 6/1998 | Rosenberg |
| 5,835,080 A | 11/1998 | Beeteson et al. |
| 5,880,411 A | 3/1999 | Gillespie et al. |
| 5,889,236 A | 3/1999 | Gillespie et al. |
| 5,917,906 A | 6/1999 | Thornton |
| 5,943,043 A | 8/1999 | Furuhata et al. |
| 5,977,867 A | 11/1999 | Blouin |
| 5,982,304 A | 11/1999 | Selker et al. |
| 6,067,116 A | 5/2000 | Yamano et al. |
| 6,154,198 A | 11/2000 | Rosenberg |
| 6,154,201 A | 11/2000 | Levin et al. |
| 6,160,540 A | 12/2000 | Fishkin et al. |
| 6,169,540 B1 | 1/2001 | Rosenberg et al. |
| 6,187,398 B1 | 2/2001 | Eldridge |
| 6,188,391 B1 | 2/2001 | Seely et al. |
| 6,218,966 B1 | 4/2001 | Goodwin et al. |
| 6,243,074 B1 | 6/2001 | Fishkin et al. |
| 6,243,078 B1 | 6/2001 | Rosenberg |
| 6,268,857 B1 | 7/2001 | Fishkin et al. |
| 6,271,828 B1 | 8/2001 | Rosenberg et al. |
| 6,278,441 B1 | 8/2001 | Gouzman et al. |
| 6,300,937 B1 | 10/2001 | Rosenberg |
| 6,310,614 B1 | 10/2001 | Maeda et al. |
| 6,323,846 B1 | 11/2001 | Westerman et al. |
| 6,337,678 B1 | 1/2002 | Fish |
| 6,354,839 B1 | 3/2002 | Schmidt et al. |
| 6,356,259 B1 | 3/2002 | Maeda et al. |
| 6,359,572 B1 | 3/2002 | Vale |
| 6,366,272 B1 | 4/2002 | Rosenberg et al. |
| 6,369,803 B2 | 4/2002 | Brisebois et al. |
| 6,384,743 B1 | 5/2002 | Vanderheiden |
| 6,414,671 B1 | 7/2002 | Gillespie et al. |
| 6,429,846 B2 | 8/2002 | Rosenberg et al. |
| 6,437,771 B1 | 8/2002 | Rosenberg et al. |
| 6,462,294 B2 | 10/2002 | Davidson et al. |
| 6,469,692 B2 | 10/2002 | Rosenberg |
| 6,486,872 B2 | 11/2002 | Rosenberg et al. |
| 6,498,353 B2 | 12/2002 | Nagle et al. |
| 6,501,462 B1 | 12/2002 | Garner |
| 6,509,892 B1 | 1/2003 | Kamper et al. |
| 6,529,183 B1 | 3/2003 | MacLean et al. |
| 6,573,844 B1 | 6/2003 | Venolia et al. |
| 6,636,202 B2 | 10/2003 | Ishmael et al. |
| 6,639,581 B1 | 10/2003 | Moore et al. |
| 6,655,788 B1 | 12/2003 | Freeman |
| 6,657,614 B1 | 12/2003 | Ito et al. |
| 6,667,738 B2 | 12/2003 | Murphy |
| 6,681,031 B2 | 1/2004 | Cohen et al. |
| 6,683,627 B1 | 1/2004 | Ullmann et al. |
| 6,686,911 B1 | 2/2004 | Levin et al. |
| 6,697,086 B2 | 2/2004 | Rosenberg et al. |
| 6,700,556 B2 | 3/2004 | Richley et al. |
| 6,703,924 B2 | 3/2004 | Tecu et al. |
| 6,743,021 B2 | 6/2004 | Prince et al. |
| 6,788,295 B1 | 9/2004 | Inkster |
| 6,819,316 B2 | 11/2004 | Schulz et al. |
| 6,850,222 B1 | 2/2005 | Rosenberg |
| 6,861,961 B2 | 3/2005 | Sandbach et al. |
| 6,877,986 B2 | 4/2005 | Fournier et al. |
| 6,881,063 B2 | 4/2005 | Yang |
| 6,930,234 B2 | 8/2005 | Davis |
| 6,937,225 B1 | 8/2005 | Kehlstadt et al. |
| 6,975,305 B2 | 12/2005 | Yamashita |
| 6,979,164 B2 | 12/2005 | Kramer |
| 6,982,696 B1 | 1/2006 | Shahoian |
| 6,995,745 B2 | 2/2006 | Boon et al. |
| 7,004,655 B2 | 2/2006 | Ferrara |
| 7,027,032 B2 | 4/2006 | Rosenberg et al. |
| 7,056,051 B2 | 6/2006 | Fiffie |
| 7,061,467 B2 | 6/2006 | Rosenberg |
| 7,064,655 B2 | 6/2006 | Murray et al. |
| 7,079,111 B2 | 7/2006 | Ho |
| 7,081,888 B2 | 7/2006 | Cok et al. |
| 7,096,852 B2 | 8/2006 | Gregorio |
| 7,102,541 B2 | 9/2006 | Rosenberg |
| 7,104,152 B2 | 9/2006 | Levin et al. |
| 7,106,305 B2 | 9/2006 | Rosenberg |
| 7,106,313 B2 | 9/2006 | Schena et al. |
| 7,109,967 B2 | 9/2006 | Hioki et al. |
| 7,112,737 B2 | 9/2006 | Ramstein |
| 7,113,166 B1 | 9/2006 | Rosenberg et al. |
| 7,116,317 B2 | 10/2006 | Gregorio et al. |
| 7,124,425 B1 | 10/2006 | Anderson, Jr. et al. |
| 7,129,854 B2 | 10/2006 | Arneson et al. |
| 7,131,073 B2 | 10/2006 | Rosenberg et al. |
| 7,136,045 B2 | 11/2006 | Rosenberg et al. |
| 7,138,977 B2 | 11/2006 | Kinerk et al. |
| 7,138,985 B2 | 11/2006 | Nakajima |
| 7,143,785 B2 | 12/2006 | Maerkl et al. |
| 7,144,616 B1 | 12/2006 | Unger et al. |
| 7,148,875 B2 | 12/2006 | Rosenberg et al. |
| 7,151,432 B2 | 12/2006 | Tierling |
| 7,151,527 B2 | 12/2006 | Culver |
| 7,151,528 B2 | 12/2006 | Taylor et al. |
| 7,154,470 B2 | 12/2006 | Tierling |
| 7,158,112 B2 | 1/2007 | Rosenberg et al. |
| 7,159,008 B1 | 1/2007 | Wies et al. |
| 7,161,276 B2 | 1/2007 | Face |
| 7,161,580 B2 | 1/2007 | Bailey et al. |
| 7,168,042 B2 | 1/2007 | Braun et al. |
| 7,176,903 B2 | 2/2007 | Katsuki et al. |
| 7,182,691 B1 | 2/2007 | Schena |
| 7,191,191 B2 | 3/2007 | Peurach et al. |
| 7,193,607 B2 | 3/2007 | Moore et al. |
| 7,195,170 B2 | 3/2007 | Matsumoto et al. |
| 7,196,688 B2 | 3/2007 | Schena |

(56) References Cited

U.S. PATENT DOCUMENTS

| | | |
|---|---|---|
| 7,198,137 B2 | 4/2007 | Olien |
| 7,199,790 B2 | 4/2007 | Rosenberg et al. |
| 7,202,851 B2 | 4/2007 | Cunningham et al. |
| 7,205,981 B2 | 4/2007 | Cunningham |
| 7,208,671 B2 | 4/2007 | Chu |
| 7,209,028 B2 | 4/2007 | Boronkay et al. |
| 7,209,113 B2 | 4/2007 | Park |
| 7,209,117 B2 | 4/2007 | Rosenberg et al. |
| 7,209,118 B2 | 4/2007 | Shahoian et al. |
| 7,210,160 B2 | 4/2007 | Anderson, Jr. et al. |
| 7,215,326 B2 | 5/2007 | Rosenberg |
| 7,216,671 B2 | 5/2007 | Unger et al. |
| 7,218,310 B2 | 5/2007 | Tierling et al. |
| 7,218,313 B2 | 5/2007 | Marcus et al. |
| 7,233,313 B2 | 6/2007 | Levin et al. |
| 7,233,315 B2 | 6/2007 | Gregorio et al. |
| 7,233,476 B2 | 6/2007 | Goldenberg et al. |
| 7,236,157 B2 | 6/2007 | Schena et al. |
| 7,245,202 B2 | 7/2007 | Levin |
| 7,245,292 B1 | 7/2007 | Custy |
| 7,249,951 B2 | 7/2007 | Bevirt et al. |
| 7,250,128 B2 | 7/2007 | Unger et al. |
| 7,253,803 B2 | 8/2007 | Schena et al. |
| 7,253,807 B2 | 8/2007 | Nakajima |
| 7,265,750 B2 | 9/2007 | Rosenberg |
| 7,280,095 B2 | 10/2007 | Grant |
| 7,283,120 B2 | 10/2007 | Grant |
| 7,283,123 B2 | 10/2007 | Braun et al. |
| 7,283,696 B2 | 10/2007 | Ticknor et al. |
| 7,289,106 B2 | 10/2007 | Bailey et al. |
| 7,289,111 B2 | 10/2007 | Asbill |
| 7,307,619 B2 | 12/2007 | Cunningham et al. |
| 7,308,831 B2 | 12/2007 | Cunningham et al. |
| 7,319,374 B2 | 1/2008 | Shahoian |
| 7,336,260 B2 | 2/2008 | Martin et al. |
| 7,336,266 B2 | 2/2008 | Hayward et al. |
| 7,339,572 B2 | 3/2008 | Schena |
| 7,339,580 B2 | 3/2008 | Westerman et al. |
| 7,342,573 B2 | 3/2008 | Ryynanen |
| 7,355,595 B2 | 4/2008 | Bathiche et al. |
| 7,369,115 B2 | 5/2008 | Cruz-Hernandez et al. |
| 7,382,357 B2 | 6/2008 | Panotopoulos et al. |
| 7,390,157 B2 | 6/2008 | Kramer |
| 7,391,861 B2 | 6/2008 | Levy |
| 7,397,466 B2 | 7/2008 | Bourdelais et al. |
| 7,403,191 B2 | 7/2008 | Sinclair |
| 7,432,910 B2 | 10/2008 | Shahoian |
| 7,432,911 B2 | 10/2008 | Skarine |
| 7,432,912 B2 | 10/2008 | Cote et al. |
| 7,433,719 B2 | 10/2008 | Dabov |
| 7,453,442 B1 | 11/2008 | Poynter |
| 7,471,280 B2 | 12/2008 | Prins |
| 7,489,309 B2 | 2/2009 | Levin et al. |
| 7,511,702 B2 | 3/2009 | Hotelling |
| 7,522,152 B2 | 4/2009 | Olien et al. |
| 7,545,289 B2 | 6/2009 | Mackey et al. |
| 7,548,232 B2 | 6/2009 | Shahoian et al. |
| 7,551,161 B2 | 6/2009 | Mann |
| 7,561,142 B2 | 7/2009 | Shahoian et al. |
| 7,567,232 B2 | 7/2009 | Rosenberg |
| 7,567,243 B2 | 7/2009 | Hayward |
| 7,589,714 B2 | 9/2009 | Funaki |
| 7,592,999 B2 | 9/2009 | Rosenberg et al. |
| 7,605,800 B2 | 10/2009 | Rosenberg |
| 7,609,178 B2 | 10/2009 | Son et al. |
| 7,656,393 B2 | 2/2010 | King et al. |
| 7,659,885 B2 | 2/2010 | Kraus et al. |
| 7,671,837 B2 | 3/2010 | Forsblad et al. |
| 7,679,611 B2 | 3/2010 | Schena |
| 7,679,839 B2 | 3/2010 | Polyakov et al. |
| 7,688,310 B2 | 3/2010 | Rosenberg |
| 7,701,438 B2 | 4/2010 | Chang et al. |
| 7,728,820 B2 | 6/2010 | Rosenberg et al. |
| 7,733,575 B2 | 6/2010 | Heim et al. |
| 7,743,348 B2 | 6/2010 | Robbins et al. |
| 7,755,602 B2 | 7/2010 | Tremblay et al. |
| 7,808,488 B2 | 10/2010 | Martin et al. |
| 7,834,853 B2 | 11/2010 | Finney et al. |
| 7,843,424 B2 | 11/2010 | Rosenberg et al. |
| 7,864,164 B2 | 1/2011 | Cunningham et al. |
| 7,869,589 B2 | 1/2011 | Tuovinen |
| 7,890,257 B2 | 2/2011 | Fyke et al. |
| 7,890,863 B2 | 2/2011 | Grant et al. |
| 7,920,131 B2 | 4/2011 | Westerman |
| 7,924,145 B2 | 4/2011 | Yuk et al. |
| 7,944,435 B2 | 5/2011 | Rosenberg et al. |
| 7,952,498 B2 | 5/2011 | Higa |
| 7,956,770 B2 | 6/2011 | Klinghult et al. |
| 7,973,773 B2 | 7/2011 | Pryor |
| 7,978,181 B2 | 7/2011 | Westerman |
| 7,978,183 B2 | 7/2011 | Rosenberg et al. |
| 7,978,186 B2 | 7/2011 | Vassallo et al. |
| 7,979,797 B2 | 7/2011 | Schena |
| 7,982,720 B2 | 7/2011 | Rosenberg et al. |
| 7,986,303 B2 | 7/2011 | Braun et al. |
| 7,986,306 B2 | 7/2011 | Eich et al. |
| 7,989,181 B2 | 8/2011 | Blattner et al. |
| 7,999,660 B2 | 8/2011 | Cybart et al. |
| 8,002,089 B2 | 8/2011 | Jasso et al. |
| 8,004,492 B2 | 8/2011 | Kramer et al. |
| 8,013,843 B2 | 9/2011 | Pryor |
| 8,020,095 B2 | 9/2011 | Braun et al. |
| 8,022,933 B2 | 9/2011 | Hardacker et al. |
| 8,031,181 B2 | 10/2011 | Rosenberg et al. |
| 8,044,826 B2 | 10/2011 | Yoo |
| 8,047,849 B2 | 11/2011 | Ahn et al. |
| 8,049,734 B2 | 11/2011 | Rosenberg et al. |
| 8,059,104 B2 | 11/2011 | Shahoian et al. |
| 8,059,105 B2 | 11/2011 | Rosenberg et al. |
| 8,063,892 B2 | 11/2011 | Shahoian et al. |
| 8,063,893 B2 | 11/2011 | Rosenberg et al. |
| 8,068,605 B2 | 11/2011 | Holmberg |
| 8,077,154 B2 | 12/2011 | Emig et al. |
| 8,077,440 B2 | 12/2011 | Krabbenborg et al. |
| 8,077,941 B2 | 12/2011 | Assmann |
| 8,094,121 B2 | 1/2012 | Obermeyer et al. |
| 8,094,806 B2 | 1/2012 | Levy |
| 8,103,472 B2 | 1/2012 | Braun et al. |
| 8,106,787 B2 | 1/2012 | Nurmi |
| 8,115,745 B2 | 2/2012 | Gray |
| 8,123,660 B2 | 2/2012 | Kruse et al. |
| 8,125,347 B2 | 2/2012 | Fahn |
| 8,125,461 B2 | 2/2012 | Weber et al. |
| 8,130,202 B2 | 3/2012 | Levine et al. |
| 8,144,129 B2 | 3/2012 | Hotelling et al. |
| 8,144,271 B2 | 3/2012 | Han |
| 8,154,512 B2 | 4/2012 | Olien et al. |
| 8,154,527 B2 | 4/2012 | Ciesla et al. |
| 8,159,461 B2 | 4/2012 | Martin et al. |
| 8,162,009 B2 | 4/2012 | Chaffee |
| 8,164,573 B2 | 4/2012 | Dacosta et al. |
| 8,166,649 B2 | 5/2012 | Moore |
| 8,169,306 B2 | 5/2012 | Schmidt et al. |
| 8,169,402 B2 | 5/2012 | Shahoian et al. |
| 8,174,372 B2 | 5/2012 | Da Costa |
| 8,174,495 B2 | 5/2012 | Takashima et al. |
| 8,174,508 B2 | 5/2012 | Sinclair et al. |
| 8,174,511 B2 | 5/2012 | Takenaka et al. |
| 8,178,808 B2 | 5/2012 | Strittmatter |
| 8,179,375 B2 | 5/2012 | Ciesla et al. |
| 8,179,377 B2 | 5/2012 | Ciesla et al. |
| 8,188,989 B2 | 5/2012 | Levin et al. |
| 8,195,243 B2 | 6/2012 | Kim et al. |
| 8,199,107 B2 | 6/2012 | Xu et al. |
| 8,199,124 B2 | 6/2012 | Ciesla et al. |
| 8,203,094 B2 | 6/2012 | Mittleman et al. |
| 8,203,537 B2 | 6/2012 | Tanabe et al. |
| 8,207,950 B2 | 6/2012 | Ciesla et al. |
| 8,212,772 B2 | 7/2012 | Shahoian |
| 8,217,903 B2 | 7/2012 | Ma et al. |
| 8,217,904 B2 | 7/2012 | Kim |
| 8,223,278 B2 | 7/2012 | Kim et al. |
| 8,224,392 B2 | 7/2012 | Kim et al. |
| 8,228,305 B2 | 7/2012 | Pryor |

(56) References Cited

U.S. PATENT DOCUMENTS

| | | |
|---|---|---|
| 8,232,976 B2 | 7/2012 | Yun et al. |
| 8,243,038 B2 | 8/2012 | Ciesla et al. |
| 8,253,052 B2 | 8/2012 | Chen |
| 8,253,703 B2 | 8/2012 | Eldering |
| 8,279,172 B2 | 10/2012 | Braun et al. |
| 8,279,193 B1 | 10/2012 | Birnbaum et al. |
| 8,310,458 B2 | 11/2012 | Faubert et al. |
| 8,345,013 B2 | 1/2013 | Heubel et al. |
| 8,350,820 B2 | 1/2013 | Deslippe et al. |
| 8,362,882 B2 | 1/2013 | Heubel et al. |
| 8,363,008 B2 | 1/2013 | Ryu et al. |
| 8,367,957 B2 | 2/2013 | Strittmatter |
| 8,368,641 B2 | 2/2013 | Tremblay et al. |
| 8,378,797 B2 | 2/2013 | Pance et al. |
| 8,384,680 B2 | 2/2013 | Paleczny et al. |
| 8,390,594 B2 | 3/2013 | Modarres et al. |
| 8,395,587 B2 | 3/2013 | Cauwels et al. |
| 8,395,591 B2 | 3/2013 | Kruglick |
| 8,400,402 B2 | 3/2013 | Son |
| 8,400,410 B2 | 3/2013 | Taylor et al. |
| 8,547,339 B2 | 10/2013 | Ciesla |
| 8,587,541 B2 * | 11/2013 | Ciesla et al. ............. 345/173 |
| 8,587,548 B2 | 11/2013 | Ciesla et al. |
| 8,749,489 B2 | 6/2014 | Ito et al. |
| 8,856,679 B2 | 10/2014 | Sirpal et al. |
| 8,970,403 B2 * | 3/2015 | Ciesla et al. ............. 341/20 |
| 9,035,898 B2 | 5/2015 | Ciesla |
| 9,075,429 B1 | 7/2015 | Karakotsios |
| 9,116,617 B2 | 8/2015 | Ciesla et al. |
| 9,274,635 B2 | 3/2016 | Birnbaum |
| 2001/0008396 A1 | 7/2001 | Komata |
| 2001/0043189 A1 | 11/2001 | Brisebois et al. |
| 2002/0063694 A1 | 5/2002 | Keely et al. |
| 2002/0104691 A1 | 8/2002 | Kent et al. |
| 2002/0106614 A1 | 8/2002 | Prince et al. |
| 2002/0110237 A1 | 8/2002 | Krishnan |
| 2002/0125084 A1 | 9/2002 | Kreuzer et al. |
| 2002/0149570 A1 | 10/2002 | Knowles et al. |
| 2002/0180620 A1 | 12/2002 | Gettemy et al. |
| 2003/0087698 A1 | 5/2003 | Nishiumi et al. |
| 2003/0117371 A1 | 6/2003 | Roberts et al. |
| 2003/0179190 A1 | 9/2003 | Franzen |
| 2003/0206153 A1 | 11/2003 | Murphy |
| 2003/0223799 A1 | 12/2003 | Pihlaja |
| 2004/0001589 A1 | 1/2004 | Mueller et al. |
| 2004/0056876 A1 | 3/2004 | Nakajima |
| 2004/0056877 A1 | 3/2004 | Nakajima |
| 2004/0106360 A1 | 6/2004 | Farmer et al. |
| 2004/0114324 A1 | 6/2004 | Kusaka et al. |
| 2004/0164968 A1 | 8/2004 | Miyamoto |
| 2004/0178006 A1 | 9/2004 | Cok |
| 2005/0007339 A1 | 1/2005 | Sato |
| 2005/0007349 A1 | 1/2005 | Vakil et al. |
| 2005/0020325 A1 | 1/2005 | Enger et al. |
| 2005/0030292 A1 | 2/2005 | Diederiks |
| 2005/0057528 A1 | 3/2005 | Kleen |
| 2005/0073506 A1 | 4/2005 | Durso |
| 2005/0088417 A1 | 4/2005 | Mulligan |
| 2005/0110768 A1 | 5/2005 | Marriott et al. |
| 2005/0162408 A1 | 7/2005 | Martchovsky |
| 2005/0212773 A1 | 9/2005 | Asbill |
| 2005/0231489 A1 | 10/2005 | Ladouceur et al. |
| 2005/0253816 A1 | 11/2005 | Himberg et al. |
| 2005/0270444 A1 | 12/2005 | Miller et al. |
| 2005/0285846 A1 | 12/2005 | Funaki |
| 2006/0026521 A1 | 2/2006 | Hotelling et al. |
| 2006/0026535 A1 | 2/2006 | Hotelling et al. |
| 2006/0053387 A1 | 3/2006 | Ording |
| 2006/0087479 A1 | 4/2006 | Sakurai et al. |
| 2006/0097991 A1 | 5/2006 | Hotelling et al. |
| 2006/0098148 A1 | 5/2006 | Kobayashi et al. |
| 2006/0118610 A1 | 6/2006 | Pihlaja et al. |
| 2006/0119586 A1 | 6/2006 | Grant et al. |
| 2006/0152474 A1 | 7/2006 | Saito et al. |
| 2006/0154216 A1 | 7/2006 | Hafez et al. |
| 2006/0197753 A1 | 9/2006 | Hotelling |
| 2006/0214923 A1 | 9/2006 | Chiu et al. |
| 2006/0238495 A1 | 10/2006 | Davis |
| 2006/0238510 A1 | 10/2006 | Panotopoulos et al. |
| 2006/0238517 A1 | 10/2006 | King et al. |
| 2006/0256075 A1 | 11/2006 | Anastas et al. |
| 2006/0278444 A1 | 12/2006 | Binstead |
| 2007/0013662 A1 | 1/2007 | Fauth |
| 2007/0036492 A1 | 2/2007 | Lee |
| 2007/0085837 A1 | 4/2007 | Ricks et al. |
| 2007/0108032 A1 | 5/2007 | Matsumoto et al. |
| 2007/0122314 A1 | 5/2007 | Strand et al. |
| 2007/0130212 A1 | 6/2007 | Peurach et al. |
| 2007/0152982 A1 | 7/2007 | Kim et al. |
| 2007/0152983 A1 | 7/2007 | Mckillop et al. |
| 2007/0165004 A1 | 7/2007 | Seelhammer et al. |
| 2007/0171210 A1 | 7/2007 | Chaudhri et al. |
| 2007/0182718 A1 | 8/2007 | Schoener et al. |
| 2007/0229233 A1 | 10/2007 | Dort |
| 2007/0229464 A1 | 10/2007 | Hotelling et al. |
| 2007/0236466 A1 | 10/2007 | Hotelling |
| 2007/0236469 A1 | 10/2007 | Woolley et al. |
| 2007/0247429 A1 | 10/2007 | Westerman |
| 2007/0257634 A1 | 11/2007 | Leschin et al. |
| 2007/0273561 A1 | 11/2007 | Philipp |
| 2007/0296702 A1 | 12/2007 | Strawn et al. |
| 2007/0296709 A1 | 12/2007 | Guanghai |
| 2008/0010593 A1 | 1/2008 | Uusitalo et al. |
| 2008/0024459 A1 | 1/2008 | Poupyrev et al. |
| 2008/0054875 A1 | 3/2008 | Saito |
| 2008/0062151 A1 | 3/2008 | Kent |
| 2008/0136791 A1 | 6/2008 | Nissar |
| 2008/0138774 A1 | 6/2008 | Ahn et al. |
| 2008/0143693 A1 | 6/2008 | Schena |
| 2008/0150911 A1 | 6/2008 | Harrison |
| 2008/0165139 A1 | 7/2008 | Hotelling et al. |
| 2008/0174321 A1 | 7/2008 | Kang et al. |
| 2008/0174570 A1 | 7/2008 | Jobs et al. |
| 2008/0202251 A1 | 8/2008 | Serban et al. |
| 2008/0238448 A1 | 10/2008 | Moore et al. |
| 2008/0248836 A1 | 10/2008 | Caine |
| 2008/0249643 A1 | 10/2008 | Nelson |
| 2008/0251368 A1 | 10/2008 | Holmberg et al. |
| 2008/0252607 A1 | 10/2008 | De et al. |
| 2008/0266264 A1 | 10/2008 | Lipponen et al. |
| 2008/0286447 A1 | 11/2008 | Alden et al. |
| 2008/0291169 A1 | 11/2008 | Brenner et al. |
| 2008/0297475 A1 | 12/2008 | Woolf et al. |
| 2008/0303796 A1 | 12/2008 | Fyke |
| 2008/0314725 A1 | 12/2008 | Karhiniemi et al. |
| 2009/0002140 A1 | 1/2009 | Higa |
| 2009/0002205 A1 | 1/2009 | Klinghult et al. |
| 2009/0002328 A1 | 1/2009 | Ullrich et al. |
| 2009/0002337 A1 | 1/2009 | Chang |
| 2009/0009480 A1 | 1/2009 | Heringslack |
| 2009/0015547 A1 | 1/2009 | Franz et al. |
| 2009/0028824 A1 | 1/2009 | Chiang et al. |
| 2009/0033617 A1 | 2/2009 | Lindberg et al. |
| 2009/0059495 A1 | 3/2009 | Matsuoka |
| 2009/0066672 A1 | 3/2009 | Tanabe et al. |
| 2009/0085878 A1 | 4/2009 | Heubel et al. |
| 2009/0106655 A1 | 4/2009 | Grant et al. |
| 2009/0115733 A1 | 5/2009 | Ma et al. |
| 2009/0115734 A1 | 5/2009 | Fredriksson et al. |
| 2009/0128376 A1 | 5/2009 | Caine et al. |
| 2009/0128503 A1 | 5/2009 | Grant et al. |
| 2009/0129021 A1 | 5/2009 | Dunn |
| 2009/0132093 A1 | 5/2009 | Arneson et al. |
| 2009/0135145 A1 | 5/2009 | Chen et al. |
| 2009/0140989 A1 | 6/2009 | Ahlgren |
| 2009/0160813 A1 | 6/2009 | Takashima et al. |
| 2009/0167508 A1 | 7/2009 | Fadell et al. |
| 2009/0167509 A1 | 7/2009 | Fadell et al. |
| 2009/0167567 A1 | 7/2009 | Halperin et al. |
| 2009/0167677 A1 | 7/2009 | Kruse et al. |
| 2009/0167704 A1 | 7/2009 | Terlizzi et al. |
| 2009/0174673 A1 | 7/2009 | Ciesla |
| 2009/0174687 A1 | 7/2009 | Ciesla et al. |
| 2009/0181724 A1 | 7/2009 | Pettersson |

(56) References Cited

U.S. PATENT DOCUMENTS

| | | |
|---|---|---|
| 2009/0182501 A1 | 7/2009 | Fyke et al. |
| 2009/0195512 A1 | 8/2009 | Pettersson |
| 2009/0207148 A1 | 8/2009 | Sugimoto et al. |
| 2009/0215500 A1 | 8/2009 | You et al. |
| 2009/0231305 A1 | 9/2009 | Hotelling et al. |
| 2009/0243998 A1 | 10/2009 | Wang |
| 2009/0250267 A1 | 10/2009 | Heubel et al. |
| 2009/0256817 A1 | 10/2009 | Perlin et al. |
| 2009/0273578 A1 | 11/2009 | Kanda et al. |
| 2009/0289922 A1 | 11/2009 | Henry |
| 2009/0303022 A1 | 12/2009 | Griffin et al. |
| 2009/0309616 A1 | 12/2009 | Klinghult |
| 2010/0043189 A1 | 2/2010 | Fukano |
| 2010/0045613 A1 | 2/2010 | Wu et al. |
| 2010/0073241 A1 | 3/2010 | Ayala et al. |
| 2010/0078231 A1 | 4/2010 | Yeh et al. |
| 2010/0079404 A1 | 4/2010 | Degner et al. |
| 2010/0090814 A1 | 4/2010 | Cybart et al. |
| 2010/0097323 A1 | 4/2010 | Edwards et al. |
| 2010/0103116 A1 | 4/2010 | Leung et al. |
| 2010/0103137 A1 | 4/2010 | Ciesla et al. |
| 2010/0109486 A1 | 5/2010 | Polyakov et al. |
| 2010/0121928 A1 | 5/2010 | Leonard |
| 2010/0141608 A1 | 6/2010 | Huang et al. |
| 2010/0142516 A1 | 6/2010 | Lawson et al. |
| 2010/0162109 A1 | 6/2010 | Chatterjee et al. |
| 2010/0171719 A1 | 7/2010 | Craig et al. |
| 2010/0171720 A1 | 7/2010 | Craig et al. |
| 2010/0171729 A1 | 7/2010 | Chun |
| 2010/0177050 A1 | 7/2010 | Heubel et al. |
| 2010/0182135 A1* | 7/2010 | Moosavi .................... 340/407.2 |
| 2010/0182245 A1 | 7/2010 | Edwards et al. |
| 2010/0225456 A1 | 9/2010 | Eldering |
| 2010/0232107 A1 | 9/2010 | Dunn |
| 2010/0237043 A1 | 9/2010 | Garlough |
| 2010/0238367 A1 | 9/2010 | Montgomery et al. |
| 2010/0295820 A1 | 11/2010 | Kikin-Gil |
| 2010/0296248 A1 | 11/2010 | Campbell et al. |
| 2010/0298032 A1 | 11/2010 | Lee et al. |
| 2010/0302199 A1 | 12/2010 | Taylor et al. |
| 2010/0321335 A1 | 12/2010 | Lim et al. |
| 2011/0001613 A1 | 1/2011 | Ciesla et al. |
| 2011/0011650 A1 | 1/2011 | Klinghult |
| 2011/0012851 A1 | 1/2011 | Ciesla et al. |
| 2011/0018813 A1 | 1/2011 | Kruglick |
| 2011/0029862 A1 | 2/2011 | Scott et al. |
| 2011/0043457 A1* | 2/2011 | Oliver et al. ................. 345/173 |
| 2011/0060998 A1 | 3/2011 | Schwartz et al. |
| 2011/0074691 A1 | 3/2011 | Causey et al. |
| 2011/0102462 A1 | 5/2011 | Birnbaum |
| 2011/0120784 A1 | 5/2011 | Osoinach et al. |
| 2011/0148793 A1 | 6/2011 | Ciesla et al. |
| 2011/0148807 A1 | 6/2011 | Fryer |
| 2011/0157056 A1 | 6/2011 | Karpfinger |
| 2011/0157080 A1 | 6/2011 | Ciesla et al. |
| 2011/0163978 A1 | 7/2011 | Park et al. |
| 2011/0175838 A1 | 7/2011 | Higa |
| 2011/0175844 A1 | 7/2011 | Berggren |
| 2011/0181530 A1 | 7/2011 | Park et al. |
| 2011/0193787 A1 | 8/2011 | Morishige et al. |
| 2011/0194230 A1 | 8/2011 | Hart et al. |
| 2011/0234502 A1 | 9/2011 | Yun et al. |
| 2011/0241442 A1 | 10/2011 | Mittleman et al. |
| 2011/0248987 A1 | 10/2011 | Mitchell |
| 2011/0254672 A1 | 10/2011 | Ciesla et al. |
| 2011/0254709 A1 | 10/2011 | Ciesla et al. |
| 2011/0254789 A1 | 10/2011 | Ciesla et al. |
| 2011/0306931 A1 | 12/2011 | Kamen et al. |
| 2012/0032886 A1 | 2/2012 | Ciesla et al. |
| 2012/0038583 A1 | 2/2012 | Westhues et al. |
| 2012/0043191 A1 | 2/2012 | Kessler et al. |
| 2012/0044277 A1 | 2/2012 | Adachi |
| 2012/0056846 A1 | 3/2012 | Zaliva |
| 2012/0062483 A1 | 3/2012 | Ciesla et al. |
| 2012/0080302 A1 | 4/2012 | Kim et al. |
| 2012/0098789 A1 | 4/2012 | Ciesla et al. |
| 2012/0105333 A1 | 5/2012 | Maschmeyer et al. |
| 2012/0120357 A1 | 5/2012 | Jiroku |
| 2012/0154324 A1 | 6/2012 | Wright et al. |
| 2012/0193211 A1 | 8/2012 | Ciesla et al. |
| 2012/0200528 A1 | 8/2012 | Ciesla et al. |
| 2012/0200529 A1 | 8/2012 | Ciesla et al. |
| 2012/0206364 A1 | 8/2012 | Ciesla et al. |
| 2012/0218213 A1 | 8/2012 | Ciesla et al. |
| 2012/0218214 A1 | 8/2012 | Ciesla et al. |
| 2012/0223914 A1 | 9/2012 | Ciesla et al. |
| 2012/0235935 A1 | 9/2012 | Ciesla et al. |
| 2012/0242607 A1 | 9/2012 | Ciesla et al. |
| 2012/0306787 A1 | 12/2012 | Ciesla et al. |
| 2013/0019207 A1 | 1/2013 | Rothkopf et al. |
| 2013/0127790 A1 | 5/2013 | Wassvik |
| 2013/0141118 A1 | 6/2013 | Guard |
| 2013/0215035 A1 | 8/2013 | Guard |
| 2013/0275888 A1 | 10/2013 | Williamson et al. |
| 2014/0043291 A1 | 2/2014 | Ciesla et al. |
| 2014/0132532 A1 | 5/2014 | Yairi et al. |
| 2014/0160044 A1 | 6/2014 | Yairi et al. |
| 2014/0160063 A1 | 6/2014 | Yairi et al. |
| 2014/0160064 A1 | 6/2014 | Yairi et al. |
| 2014/0176489 A1 | 6/2014 | Park |
| 2015/0009150 A1 | 1/2015 | Cho et al. |
| 2015/0015573 A1 | 1/2015 | Burtzlaff et al. |
| 2015/0091834 A1 | 4/2015 | Johnson |
| 2015/0091870 A1 | 4/2015 | Ciesla et al. |
| 2015/0138110 A1 | 5/2015 | Yairi et al. |
| 2015/0145657 A1 | 5/2015 | Levesque et al. |
| 2015/0205419 A1 | 7/2015 | Calub et al. |
| 2015/0293591 A1 | 10/2015 | Yairi et al. |

FOREIGN PATENT DOCUMENTS

| | | |
|---|---|---|
| CN | 1882460 A | 12/2006 |
| EP | 2000884 A1 | 12/2008 |
| GB | 190403152 A | 12/1904 |
| GB | 108771 A | 8/1917 |
| GB | 1242418 A | 8/1971 |
| JP | s63164122 A | 7/1988 |
| JP | 10255106 | 9/1998 |
| JP | H10255106 | 9/1998 |
| JP | 2006268068 A | 10/2006 |
| JP | 2006285785 A | 10/2006 |
| JP | 200964357 A | 3/2009 |
| JP | 2009064357 A | 3/2009 |
| JP | 2010039602 A | 2/2010 |
| JP | 2010072743 A | 4/2010 |
| JP | 2011508935 A | 3/2011 |
| KR | 20000010511 | 2/2000 |
| KR | 100677624 B | 1/2007 |
| KR | 20090023364 | 11/2012 |
| WO | 2004028955 A2 | 4/2004 |
| WO | 2006082020 A1 | 8/2006 |
| WO | 2008037275 A | 4/2008 |
| WO | 2009002605 A | 12/2008 |
| WO | 2009044027 A2 | 4/2009 |
| WO | 2009067572 A2 | 5/2009 |
| WO | 2009088985 A1 | 7/2009 |
| WO | 2010077382 A | 7/2010 |
| WO | 2010078596 A | 7/2010 |
| WO | 2010078597 A | 7/2010 |
| WO | 2011003113 A | 1/2011 |
| WO | 2011087816 A | 7/2011 |
| WO | 2011087817 A | 7/2011 |
| WO | 2011108382 A1 | 9/2011 |
| WO | 2011112984 A | 9/2011 |
| WO | 2011118382 A1 | 9/2011 |
| WO | 2011133604 A | 10/2011 |
| WO | 2011133605 A | 10/2011 |
| WO | 2013173624 A2 | 11/2013 |
| WO | 2014047656 A2 | 3/2014 |

OTHER PUBLICATIONS

Essilor. "Ophthalmic Optic Files Materials," Essilor International, Ser 145 Paris France, Mar. 1997, pp. 1-29, [retrieved on Nov. 18, (56) References Cited

OTHER PUBLICATIONS

2014].Retrieved from the internet. URL: <http://www.es-siloracademy.eu/sites/default/files/9.Materials.pdf>.
Jeong et al., "Tunable Microdoublet Lens Array," Optical Society of America, Optics Express; vol. 12, No. 11. May 31, 2004, 7 Pages.
Lind. "Two Decades of Negative Thermal Expansion Research: Where Do We Stand?" Deparment of Chemistry, the University of Toledo, Materials 2012, 5, 1125-1154; doi:10.3390/ma5061125, Jun. 20, 2012 pp. 1125-1154, ([retrieved on Nov. 18, 2014]. Retrieved from the internet. URL: <https://www.google.com/webhp?sourceid=chrome-instant&ion=1&espv=2&ie=UTF-8#q=materials-05-01125.pdf>.
Preumont, A. Vibration Control of Active Structures: An Introduction, Jul. 2011.

* cited by examiner

METHOD FOR ACTUATING A TACTILE INTERFACE LAYER

CROSS-REFERENCE TO RELATED APPLICATIONS

This application is a continuation of U.S. patent application Ser. No. 13/090,217, filed on 19 Apr. 2011, which claims the benefit of U.S. Provisional Application No. 61/325,772, filed on 19 Apr. 2010, which are both incorporated in their entireties by this reference.

This application is related to U.S. patent application Ser. No. 11/969,848 filed on 4 Jan. 2008, U.S. patent application Ser. No. 12/319,334 filed on 5 Jan. 2009, U.S. patent application Ser. No. 12/497,622 filed on 3 Jul. 2009, which are all incorporated in their entirety by this reference.

TECHNICAL FIELD

This invention relates generally to tactile user interfaces, and more specifically to a new and useful method for interpreting gestures as commands for a tactile interface layer with a deformable region.

BRIEF DESCRIPTION OF THE FIGURES

FIGS. 7A-9B are schematic representations of a first, second, and third variation in the manipulation of the firmness of the deformed particular region in the first preferred embodiment.

FIGS. 10A-11C are schematic representations of a first and second variation in the manipulation of a first and second particular region in the second preferred embodiment.

DESCRIPTION OF THE PREFERRED EMBODIMENTS

The following description of the preferred embodiments of the invention is not intended to limit the invention to these preferred embodiments, but rather to enable any person skilled in the art to make and use this invention.

Figure 1:
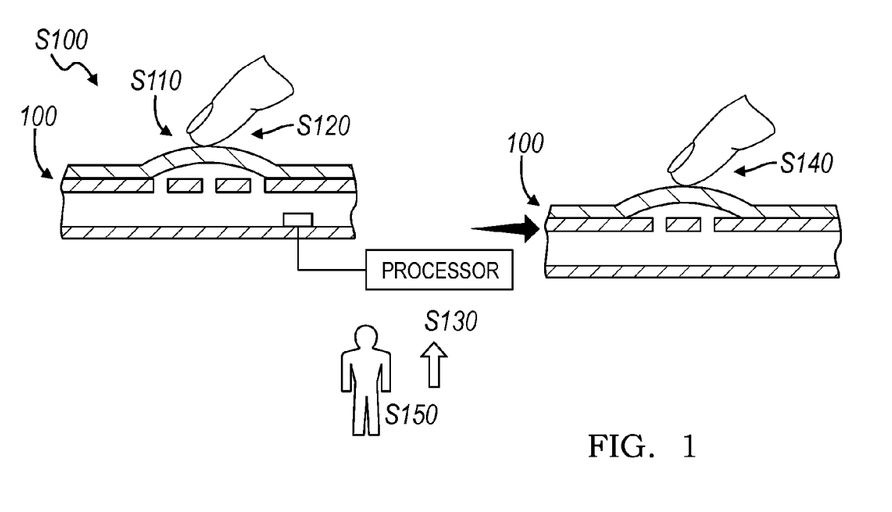
FIG. 1 is a schematic representation of the method of the first preferred embodiment.
Figure 2:
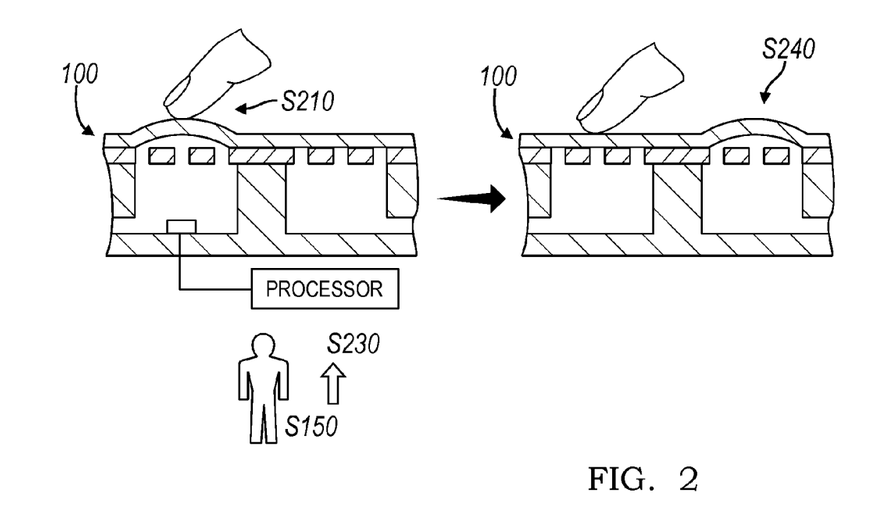
FIG. 2 is a schematic representation of the method of the second preferred embodiment.

As shown in FIGS. 1 and 2, the method S100 for actuating a tactile interface layer 100 of a device that defines a surface with a deformable region of the preferred embodiments includes deforming a deformable region of the surface into a formation tactilely distinguishable from the surface Step S110 and S210, detecting a force from the user on the deformed region of the surface Steps S120 and S220, interpreting a command for the deformable region of the surface based on the detected force, and manipulating the deformable regions based on the command. In the first preferred embodiment, as shown in FIG. 1, the step of interpreting a command includes interpreting the force on the deformable region as a command for the firmness of the deformed deformable region Step S130 and the step of manipulating the deformable regions based on the command includes manipulating the firmness of the deformable region of the surface based on the command Step S140. In the second preferred embodiment, as shown in FIG. 2, the tactile interface layer includes a first and second deformable region and the step of interpreting a command includes interpreting the force on the deformed deformable region as a command to undeform the first deformable region and to deform the second deformable region into formation tactilely distinguishable from the surface Step S230 and the step of manipulating the deformable regions based on the command includes manipulating the first and second deformable regions based on the command Step S240. The method S100 for actuating a tactile interface layer 100 of a device may also include detecting a force from the user on a plurality of deformed deformable regions, which may also include the step of detecting the sequence in which a force is detected on each of the deformed deformable regions. In this variation, the step of interpreting a command may include interpreting a command for at least one deformable region of the surface based on the detected sequence of forces. However, any other suitable type of force detection relative to the deformed deformable regions of the surface may be used.

The method S100 of the first and second preferred embodiments for actuating a tactile interface layer 100 may also include the step of receiving a user input for a particular interpretation of a force as a command Step S150. The step of receiving a user input for a particular interpretation of a force as a command Step S150 may include receiving a user input from the user of the device, but may alternatively include receiving a user input from a person remote from the device, for example, a third party such as the manufacturer or a second user. However, the user input for a particular interpretation of a force as a command may be received from any other suitable user. The method S100 is preferably applied to a tactile interface layer 100 that is to be used with an electronic device. More preferably, in an electronic device that benefits from an adaptive user interface. The electronic device may or may not include a display and/or a touch sensor, for example, an automotive console, a steering wheel, a desktop computer, a laptop computer, a tablet computer, a television, a radio, a desk phone, a mobile phone, a PDA, a personal navigation device, a personal media player, a camera, a watch, a remote control, a mouse, a trackpad, or a keyboard. The tactile interface layer 100 may, however, be used as the user interface for any suitable device that interfaces with a user in a tactile and/or visual manner. The tactile interface layer 100 is preferably integrated with the device, for example, in the variation wherein the tactile interface layer 100 includes a sensor 140, the tactile interface layer 100 is preferably assembled into the device and presented to the user as one unit. Alternatively, the tactile interface layer 100 may function as an accessory to a device, the user may be presented the tactile interface layer 100 and the device as two separate units wherein, when coupled to each other, the tactile interface layer 100 functions to provide tactile guidance to the user and/or to receive user inputs. However, the method S100 may be applied to any other suitable arrangement of the tactile interface layer 100.

Figure 3:
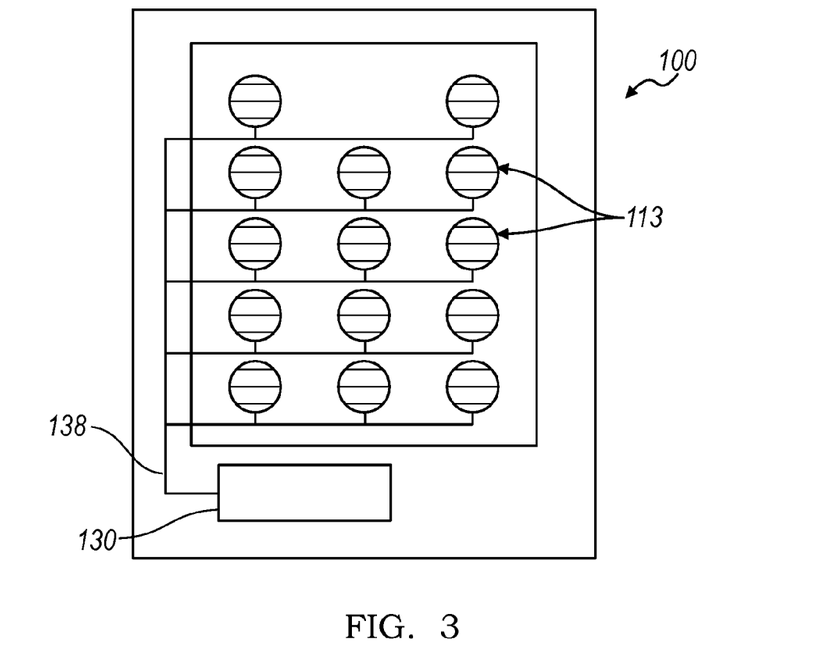
FIG. 3 is a top view of a variation of the tactile interface layer.
Figure 4:
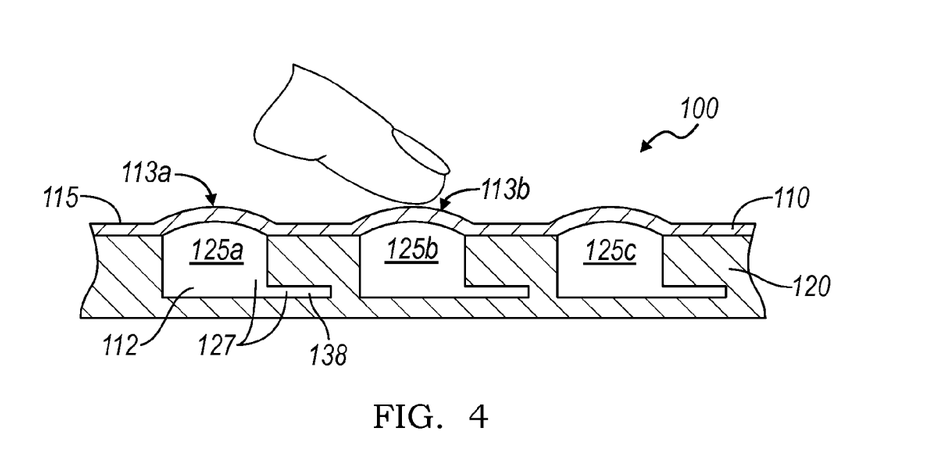
FIG. 4 is a cross sectional view of a variation of the tactile interface layer.
Figures 5A, 5B:
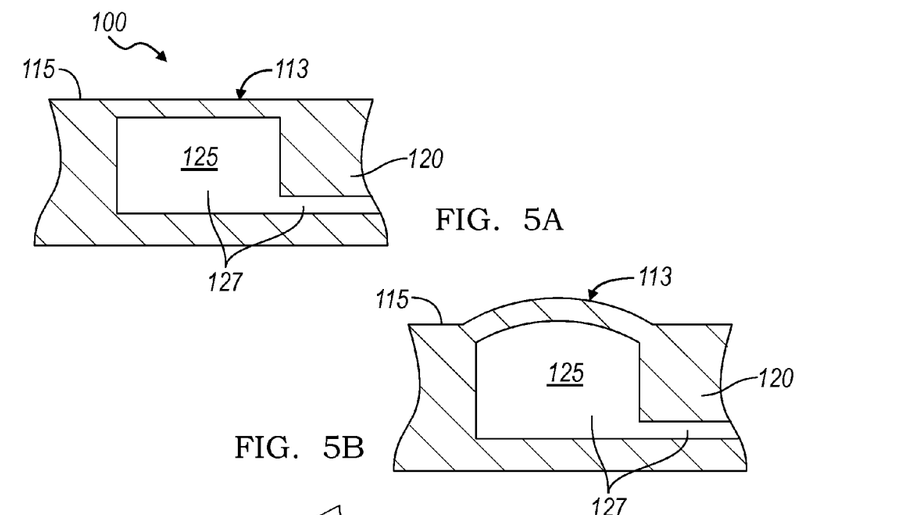
FIGS. 5A-5C are cross-sectional views illustrating the operation of a deformable region of a tactile interface layer.
Figure 5C:
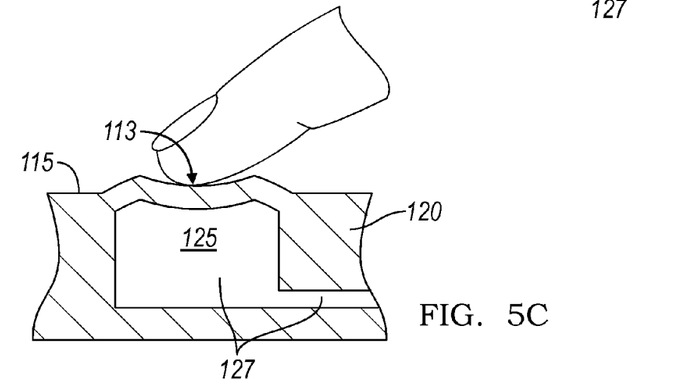

The method S100 of the preferred embodiments is preferably applied to any suitable tactile interface layer that includes deformable regions. In particular, as shown in FIGS. 3-5, the method S100 of the preferred embodiments may be applied to the user interface system as described in U.S. application Ser. Nos. 11/969,848, 12/319,334, and 12/497,622. The tactile interface layer 100 of this variation preferably includes a layer 110 that defines a surface 115, a substrate 120 that supports the layer 110 and at least partially defines a fluid vessel 127 that includes a volume of fluid 112, and a displacement device 130 coupled to the fluid vessel 127 that manipulates the volume of fluid 112 to expand and/or contract at least a portion of the fluid vessel 127, thereby deforming a particular region 113 of the surface 115. The substrate 115 may also function to substantially prevent the layer 110 from inwardly deforming, for example, into the fluid vessel 127. In this variation of the tactile interface layer 100, the steps of manipulating the deformable region of the surface based on the command Steps S140 and S240 preferably include manipulating the fluid within the fluid vessel 127. In particular, the displacement device 130 is preferably actuated to manipulate the fluid within the fluid vessel 127 to deform a particular region 113 of the surface. The fluid vessel 127 preferably includes a cavity 125 and the displacement device 130 preferably influences the volume of fluid 112 within the cavity 125 to expand and retract the cavity 125. However, any other suitable method of manipulating the fluid 112 may be used.

Figure 6:
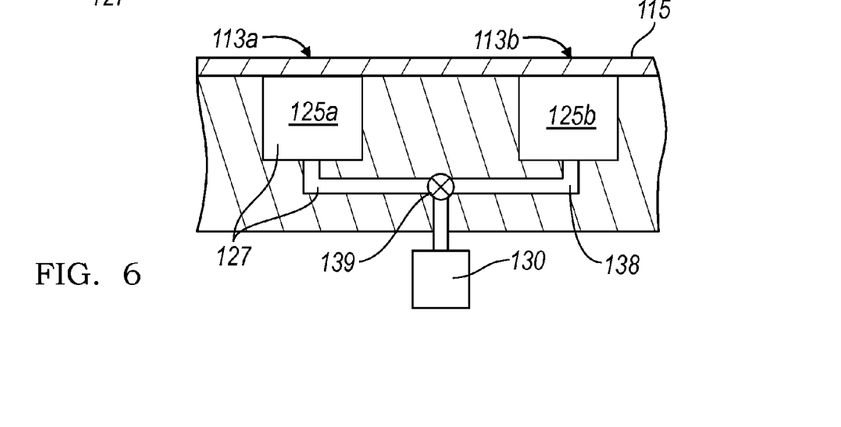
FIG. 6 is a cross sectional view of a variation of the tactile interface layer with a valve.

The fluid vessel 127 may alternatively be a channel 138 or a combination of a channel 138 and a cavity 125, as shown in FIG. 4. The fluid vessel 127 may also include a second cavity 125b in addition to a first cavity 125a. When the second cavity 125b is expanded, a second particular region 113 on the surface 115 is preferably deformed. The displacement device 130 preferably influences the volume of fluid 112 within the second cavity 125b independently of the first cavity 125a. As shown in FIG. 6, the tactile interface layer of this variation may include a valve 139 that functions to direct fluid within the tactile interface layer 100. In this variation, the step of manipulating the fluid within the fluid vessel 127 may include actuating the valve 139 to direct fluid within the tactile interface layer 100. Alternatively, the user interface enhancement system 100 may include a second displacement device 130 that functions to influence the volume of fluid 112 within the second cavity 125b to expand and retract the second cavity 125b, thereby deforming a second particular region 113b of the surface. The second cavity 125b is preferably similar or identical to the cavity 125, but may alternatively be any other suitable kind of cavity. The following examples may be described as expanding a fluid vessel 127 that includes a cavity 125 and a channel 138, but the fluid vessel 127 may be any other suitable combination of combination of cavity 125 and/or channel 138. However, any other suitable type of tactile interface layer 100 may be used.

The tactile interface layer 100 preferably functions to provide tactile guidance to the user when using a device that tactile interface layer 100 to. As shown in FIG. 5, the surface 115 of the tactile interface layer 100 preferably remains flat until tactile guidance is to be provided to the user at the location of the particular region 113. In the variation of the tactile interface layer 100 as described above, the displacement device 130 then preferably expands the cavity 125 (or any other suitable portion of the fluid vessel 127) to expand the particular region 113 outward, forming a deformation that may be felt by a user (referenced throughout this document as a "tactilely distinguishable formation"), and providing tactile guidance for the user. The expanded particular region 113 preferably also provides tactile feedback to the user when he or she applies force onto the particular region 113 to provide input. This tactile feedback may be the result of Newton's third law, whenever a first body (the user's finger) exerts a force on a second body (the surface 115), the second body exerts an equal and opposite force on the first body, or, in other words, a passive tactile response. Alternatively, the displacement device 130 may retract the cavity 125 to deform the particular region 113 inward. However, any other suitable method of deforming a particular region 113 of the tactile interface layer 100 may be used.

The tactile interface layer 100 preferably includes a sensor that functions to detect the force applied to the deformed particular region 113 by the user. The force may be a force that substantially inwardly deforms the deformed particular region 113 of the surface, but may alternatively be a force that does not substantially inwardly deform the deformed particular region 113. However, any other suitable type of force may be detected. At a sensor coupled to the tactile interface layer, an input may be detected that is applied at the deformable region in the expanded setting. Substantially simultaneously, an increase in pressure of fluid in the fluid vessel may be detected. For example, in the variation of the tactile layer as described above, the sensor may be a pressure sensor that functions to detect the increased pressure within the fluid 112 that results from an inward deformation of the deformed particular region 113. Alternatively, the sensor may be a capacitive sensor that detects the presence of a finger on the deformed particular region 113. In this variation, the presence of a force is deduced from the detected presence of the finger of the user. Alternatively, the sensor may be a sensor included in the device to which the tactile interface layer 100 is applied to, for example, the device may include a touch sensitive display onto which the tactile interface layer 100 is overlaid. The force of the user may be detected using the sensing capabilities of the touch sensitive display. However, any other suitable force detection may be used.

Similarly, the tactile interface layer 100 preferably includes a processor that functions to interpret the detected gesture as a command. The processor may include a storage device that functions to store a plurality of force types (for example, the magnitude of the force or the duration of the applied force) and command associations and/or user preferences for interpretations of the force as commands. The processor may be any suitable type of processor and the storage device may be any suitable type of storage device, for example, a flash memory device, a hard drive, or any other suitable type. The processor and/or storage device may alternatively be a processor and/or storage device included into the device that the tactile interface layer 100 is applied to. However, any other suitable arrangement of the processor and/or storage device may be used.

Figure 7A:
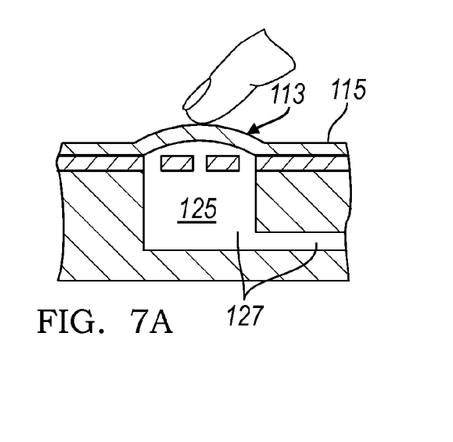
Figure 7B:
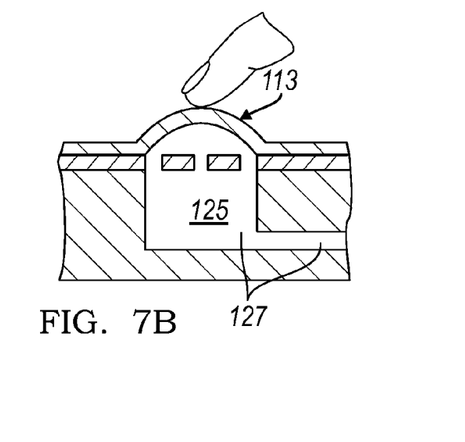
Figure 8A:
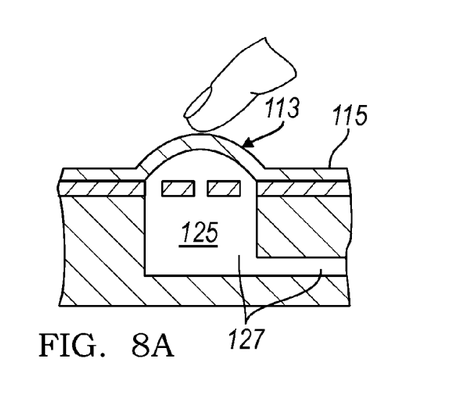
Figure 8B:
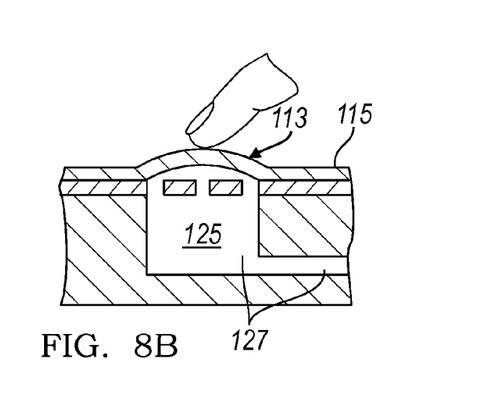
Figure 9A:
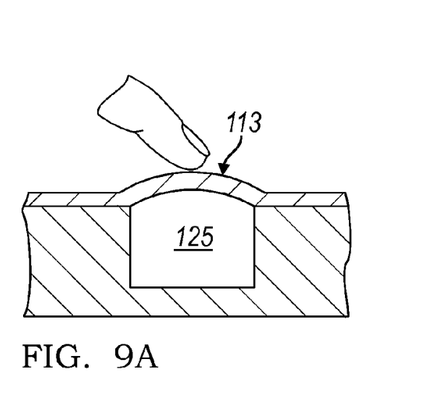
Figure 9B:
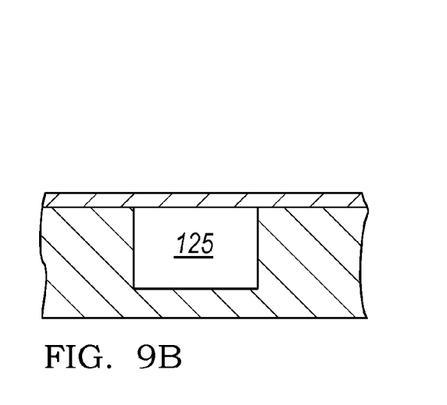

As shown in FIGS. 7-9, in the first preferred embodiment of the method S100, the force on the deformed particular region is interpreted as a command for the firmness of the deformed particular region Step S130 and the firmness of the deformed particular region is manipulated based on the command Step S140. The manipulation of the firmness of the deformed particular region may alternatively be thought of as manipulating the degree of deformation of the deformed particular region. For example, a fully deformed particular region 113 is of the highest firmness degree while a medium deformed particular region 113 is of a medium firmness degree. In the variation of the tactile interface layer as described above, manipulating the deformed particular region based on the command to change the firmness of the deformed particular region preferably includes manipulating the volume of fluid 112 within the fluid vessel 127. As the pressure within the volume of fluid 112 is increased, the firmness of the resulting deformed particular region 113 will also increase. Similarly, as the pressure within the volume of fluid 112 is decreased, the firmness of the resulting deformed particular region 113 will also decrease. As shown in FIGS. 7 and 8, as the pressure of the volume of fluid 112 is changed, size of the deformed particular region 113 may change due to the elasticity of the layer no. In this variation, a change in firmness of the deformed particular region 113 may also be thought of as a change in the size and/or height of the deformed particular region 113. For example, as shown in FIG. 7, the pressure of the volume of fluid 112 corresponding to the deformable region is increased and the resulting deformed particular region 113 is both stiffer and taller than the original deformed particular region 113. In a second example as shown in FIG. 8, the pressure of the volume of fluid 112 is decreased and the resulting deformed particular region 113 is both less stiff and less tall than the original deformed particular region 113. In a third example, the pressure of the volume of fluid 112 corresponding to the deformable region is increased to increase the surface area of the deformed particular region 113. In this variation, the height of the deformed particular region 113 may change, but it may alternatively remain the same. However, any other suitable combination of firmness and size of the deformed particular region resulting from the manipulation of the firmness of the deformed particular region 113 in Step S140 may be used.

In a variation of the first preferred embodiment, as shown in FIG. 9, the step of manipulating the deformable region may include undeforming the deformed particular region 113 such that the particular region of the surface 113 is no longer deformed. In other words, the firmness and/or the height of the deformed particular region is "removed" or decreased to zero. This may be a useful tactile experience where the user is to select items from a list, for example, a check box or a "YES/NO" selection box to tactilely indicate to the user when a certain selection has already been made. However, any other suitable application of this variation of the first preferred embodiment may be used.

Figure 10A:
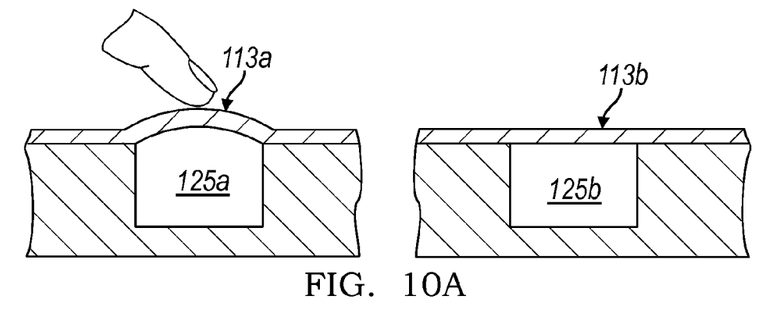
Figure 10B:
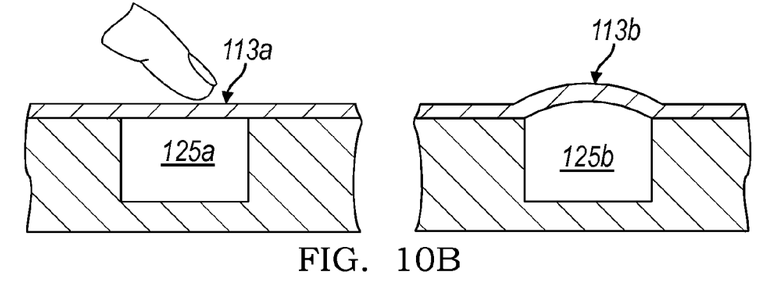
Figure 11A:
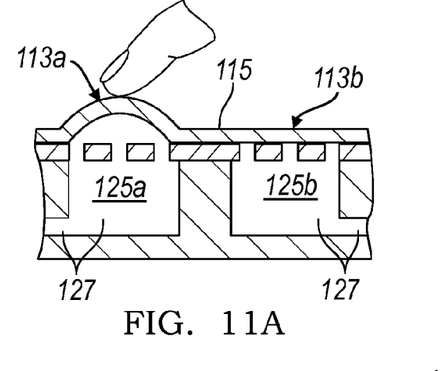
Figure 11B:
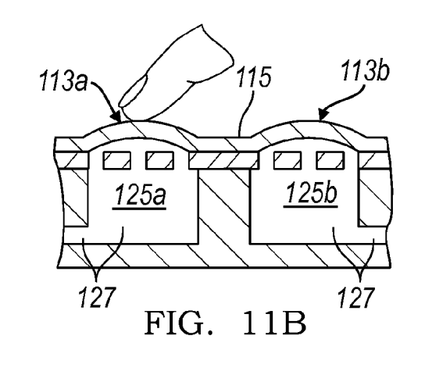
Figure 11C:
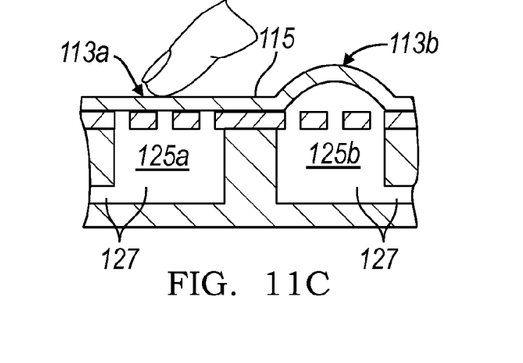

As shown in FIGS. 10-11, in the second preferred embodiment of the method S100, the tactile interface layer preferably includes a first and a second particular region 113a and 113b, and the force on the first deformed particular region 113a is interpreted as a command to undeform the first particular region 113a and to deform the second particular region 113b Step S230, and the first and second particular regions 113a and 113b are manipulated based on the command Step S240. The first and second particular regions 113a and 113b may be substantially proximal to each other, for example, along the same face of the device. Alternatively, the first and second particular regions 113a and 113b may be substantially distal fro each other, for example, the first particular region 113a may be on a first face of the device and the second particular region 113b may be on a second face of the device. In this variation, the first face of the device may include a display and the second face of the device may not include a display. However, any other suitable arrangement of the first and second particular regions 113a and 113b may be used. The force may alternatively be interpreted as a command to further deform the first particular region 113a and to undeform the second particular region 113b. However, any other suitable combination of deformation and undeformation of the first and second particular regions 113a and 113b may be used. The interpreted command may be to fully undeform the first particular region 113a and to fully deform the second particular region 113b, which may provide the user with a "rocker switch" type of experience, as shown in FIG. 10. In this variation, both the first and second particular regions 113a and 113b may be located on the same device, for example, to provide a tactile experience where the user is to toggle between two selections for a particular, for example, "Audio ON" and "Audio OFF" to toggle a location within a game, for example, selecting tiles within the popular Minesweeper game. Alternatively, the second particular region 113b may be located on a second tactile interface layer 100 that is applied to a second device, where the second device is linked to the first device, for example, through the Internet, through a WiFi connection, through a Bluetooth connection, or any other suitable connection. Control of the second tactile interface layer 100 is may be independent of the control of the first user interface 100; for example, the second particular region 113b may be deformed independently of the first particular region 113a. Alternatively, control of the second tactile interface layer may be linked to the control of the first tactile interface layer 100. This may be a useful tactile experience where the first device and the second device are transmitting tactile communication, for example, when a user using the first device creates a pattern by undeforming a pattern of deformed particular regions 113 and another user using the second device "sees" the pattern that the first user is creating deformable particular regions 113 corresponding to the undeformed particular regions 113 on the first device are deformed. This type of feature may be used in a gaming device or gaming application where a first player uses tactile communication with a second player. However, any other suitable application of a "rocker switch" type active response may be used.

Alternatively, the interpreted command may be to undeform the first particular region 113a to a particular degree and to deform the second particular region 113b to a particular degree, as shown in FIGURE ii. The degree to which to undeform and deform the first and second particular regions 113a and 113b may be determined based on the detected attributes of the force. In a first example, the magnitude of the force may determine the particular degrees. In the variation where the tactile interface layer includes fluid 112 and a pressure sensor, the pressure increase within the fluid 112 may be used to determine the magnitude of the force. However, the magnitude of the force may be determined using any other suitable method, for example, the applied force may displace the volume of fluid 112 from one location within the fluid vessel 127 to another. The magnitude of the force may be determined by measuring the amount of fluid displacement. In a second example, the duration of the applied force may be used to determine the particular degrees. In the variation where the tactile interface layer includes a sensor that is a capacitive sensor, the presence of the finger of the user may be detected and the period of time for which the presence of the finger is detected may be used to determine the particular degrees. In a third example, the rate at which the force is applied may be used to determine the particular degrees. As described above, the volume of fluid 112 displaced by the applied force may be measured. In this variation, the rate at which the force is applied may be determined by detecting the rate at which the volume of fluid 112 is displaced. However, the particular degrees to which to undeform and deform the first and second particular regions 113a and 113b may be interpreted from the detected force using any other suitable method.

Additionally, the particular degrees to undeform and deform the first and second particular regions 113a and 113b may be percentages of the full deformation of each of the particular regions 113a and 113b, where the sum of the percentage of deformation of the first and second particular regions 113a and 113b is 100%. In other words, the command may include undeforming the first particular region 113a to 25% of full deformation and deforming the second particular region 113b to 75% of the full deformation. This may provide a tactile experience to the user that is similar to pushing a mass from one location to another location, where there is a conservation of mass. Alternatively, the percentages may have a sum of greater than or less than 100%. For example, the command may include deforming each of the first and second particular regions 113a and 113b to 60% of full deformation. However, any other suitable command for the undeformation and deformation of the first and second particular regions 113a and 113b may be interpreted.

In the variation of the tactile interface layer 100 as described above, the fluid vessel 127 includes a first cavity 125a that corresponds to the first particular region 113a and a second cavity 125b that corresponds to the second particular region 113b. The displacement device 130 is preferably actuated to expand the second cavity 125b and retract the first cavity 125a. Retraction of the first cavity 125a (or the undeformation of the first particular region 113a) and the expansion of the second cavity 125b (or the deformation of the second particular region 113b) preferably happen substantially concurrently, as shown in FIG. 10. In this variation, when the force and command are interpreted on the deformed first particular region, as shown in FIGURE boa, the volume of fluid within the first cavity 125a is decreased while the volume of fluid within the second cavity 125b is increased, as shown in FIG. 10b. A volume of fluid 112 may be transferred between the first and second cavities 125a and 125b by the displacement device 130, but the displacement device 130 may alternatively displace any other suitable volume of fluid 112 from and to the first and second cavities 125a and 125b. For example, the displacement device 130 may displace a volume of fluid towards the first and second cavities 125a and 125b through the valve 139, and the valve 139 directs a first portion of the fluid towards the first cavity 125a and a second portion of the fluid towards the second cavity 125b.

As described in the first preferred embodiment, a change in the volume of fluid within the first and second cavities 125a and 125b may also be thought of as a change in the firmness of the corresponding deformed particular region 113a and 113b, respectively. In a variation of the second preferred embodiment, the undeformation and deformation of the first and second particular regions 113a and 113b may alternatively be thought of as a decrease in firmness of the first particular region 113a and an increase in firmness of the second particular region 113b. An exemplary usage of this variation of the second preferred embodiment may be in a user interface that includes two buttons for increasing and decreasing a particular feature of the device, for example, the volume of sound output. The deformed first particular region 113a may represent the "increase volume" button and the second particular region 113b may represent the "decrease volume" button. As a force is detected on the first particular region 113a, the firmness of the first particular region 113a may be increased and the firmness of a second particular region 113 corresponding to a "decrease volume" button decreases, representing the shift towards the higher range along the range of available volume outputs. However, any other suitable application of this variation may be used.

In the method S100 of the first and second preferred embodiments, the interpretation of the force detected on the deformed deformable region as a command may be adjusted based on the state of the deformed deformable region. For example, if a force is detected when the deformed deformable region is not fully deformed, the command may be to increase the firmness and if a force is detected when the deformed deformable region is fully deformed, the interpreted command may be to decrease the firmness. In a second example, the interpretation of a command when a force is detected as a deformable region is being expanded may be different from when a force is detected as a deformable region is being undeformed. However, any other suitable interpretation of the force as a command based on the state of the deformed deformable region may be used.

While the interpretation of a force detected on a deformed particular region 113 as a command is preferably one of the variations described above, the interpretation may alternatively be a combination of the variations described above or any other suitable combination of gestures and commands, for example, a force may be detected on an undeformed deformable region and then interpreted as a command for the deformable region. However, any other suitable type of force detection and force interpretation may be used.

As a person skilled in the art will recognize from the previous detailed description and from the figures and claims, modifications and changes can be made to the preferred embodiments of the invention without departing from the scope of this invention defined in the following claims.

We claim:

1. A method for actuating a tactile interface layer coupled to a device, the tactile interface layer comprising a surface and a substrate, the surface defining a deformable region and a second region adjacent the deformable region, the substrate defining a fluid vessel adjacent the deformable region, the method comprising:
displacing fluid into the fluid vessel to transition the deformable region from a retracted setting to an expanded setting tactilely distinguishable from the second region and offset above the second region by a first height;
at a sensor coupled to the tactile interface layer, detecting a user input which applies a force at the deformable region in the expanded setting;
substantially simultaneously, detecting an increase in pressure of fluid in the fluid vessel by a second sensor;
in response to the force, displacing fluid out of the fluid vessel to transition the deformable region from the expanded setting offset above the second region by the first height to a second setting offset above the second region by a second height less than the first height, a change in height between the expanded setting and the second setting proportional to the detected increase in pressure.

2. The method of claim 1, further comprising, in response to displacing fluid out of the fluid vessel to transition the deformable region from the expanded setting to the second setting, displacing fluid into the fluid vessel to increase pressure within the fluid vessel adjacent the deformable region in the second setting.

3. The method of claim 2, wherein displacing fluid into the fluid vessel to increase pressure increases resistance to depression of the deformable region toward the substrate.

4. The method of claim 1, wherein detecting an increase in pressure in the fluid vessel comprises, at a pressure sensor fluidly coupled to the fluid vessel, detecting a change in pressure and, in response to the change in pressure greater than a threshold pressure change, interpreting the change in pressure as a command to displace fluid out of the fluid vessel, the second sensor including the pressure sensor.

5. The method of claim 1, further comprising detecting an initial pressure in the fluid vessel corresponding to the deformable region in the expanded setting; wherein displacing fluid out of the fluid channel comprises displacing a volume of fluid out of the fluid vessel, the volume of fluid substantially proportional to the increase in pressure in the fluid to restore the initial pressure in the fluid vessel.

6. The method of claim 1, wherein displacing fluid out of the fluid vessel comprises displacing fluid out the fluid vessel to transition the deformable region from the expanded setting to the second setting offset above the second region by a second height less than the first height; wherein pressure in the fluid vessel at the second height is greater than pressure in the fluid vessel at the first height.

7. A method for actuating a tactile interface layer coupled to a device, the tactile interface layer comprising a surface and a substrate, the surface defining a deformable region and a second region adjacent the deformable region, the substrate defining a fluid vessel adjacent the deformable region, the method comprising:
    displacing fluid into the fluid vessel at a first pressure to transition the deformable region from a retracted setting to an expanded setting tactilely distinguishable from the second region and the deformable region in the retracted setting;
    at a sensor coupled to the tactile interface layer, detecting an input which applies a force at the deformable region, the force displacing the deformable region from the expanded setting to a second setting tactilely distinguishable from the expanded setting;
    substantially simultaneously, detecting by a second sensor an increase in pressure from the first pressure to a second pressure in the fluid vessel;
    with the deformable region in the second setting, displacing fluid into the fluid vessel to change pressure in the fluid vessel from the second pressure to a third pressure in response to the detected increase in pressure, the deformable region stable in the second setting at the third pressure.

8. The method of claim 7, wherein displacing fluid into the fluid vessel comprises increasing pressure in the fluid vessel from the second pressure to the third pressure, greater than the second pressure by a magnitude proportional to the increase in pressure from the first pressure to the second pressure.

9. The method of claim 7, wherein displacing fluid into the fluid vessel comprises displacing fluid into the fluid vessel to increase pressure in the fluid vessel from the second pressure to the third pressure greater than the second pressure by a magnitude proportional to the increase in pressure from the first pressure to the second pressure.

10. The method of claim 9, wherein displacing fluid into the fluid vessel comprises increasing pressure in the fluid vessel from the second pressure to the third pressure greater than the second pressure by a magnitude substantially equal to the increase in pressure from the first pressure to the second pressure.

11. A method for actuating a tactile layer coupled to a computing device and comprising a surface defining a first deformable region, a second deformable region, and a third region adjacent the first deformable region and the second deformable region, the tactile interface layer defining a first fluid vessel adjacent the first deformable region and a second fluid vessel adjacent the second deformable region, the method comprising:
    at a sensor, detecting a user input at the first deformable region in an expanded setting, the input applying a force displacing the first deformable region toward the substrate, the first deformable region offset above the third region in the expanded setting, the second deformable region in a retracted setting substantially flush with the first region, the input pressing the deformable region toward the substrate;
    substantially simultaneously, detecting by a second sensor a change in pressure in the fluid vessel corresponding to the input;
    in response to the change in pressure, displacing a first volume of fluid from the first fluid vessel to transition the deformable region from the expanded setting to a second setting tactilely distinguishable from the expanded setting;
    substantially simultaneously, displacing a second volume of fluid into the second fluid vessel to transition the second deformable region from the retracted setting to a third setting tactilely distinguishable from the retracted setting, a ratio of the second volume of fluid to the first volume of fluid proportional to the detected change in pressure.

12. The method of claim 11, further comprising rendering a first graphical icon and a second graphical icon on a display coupled to the tactile layer substrate opposite the surface, the first graphical icon substantially aligned with the first deformable region and second graphical icon substantially aligned with the second deformable region; wherein detecting an input at the first deformable region comprises detecting the input at the first deformable region and defining the input as a selection of the first graphical icon; wherein displacing a second volume of fluid into the second fluid vessel to transition the second deformable region from the retracted setting to a third setting comprises defining an input button detect selecting the second graphical icon.

13. The method of claim 12, wherein rendering the first graphical icon and the second graphical icon comprises rendering a graphical toggle switch, a first button of the toggle switch corresponding to the first graphical icon, a second button of the toggle switch corresponding to the second graphical icon.

14. The method of claim 11, wherein displacing the second volume of fluid into the second fluid vessel comprises displacing the first volume of fluid from the first fluid vessel into the second fluid vessel to transition the first deformable region from the expanded setting to the retracted setting and substantially simultaneously transition the second deformable region from the retracted setting to expanded setting.

15. The method of claim 11, wherein displacing the first volume of fluid from the first fluid vessel comprises gradually decreasing the first volume of fluid in the first fluid vessel; and wherein displacing a second volume of fluid into the second fluid vessel comprises gradually increasing the second volume of fluid in the second fluid vessel.

16. The method of claim 11, wherein displacing the first volume of fluid from the first fluid vessel comprises retracting the first deformable region by a degree of deformation to the second setting offset above the third region by a first height; and wherein displacing the second volume of fluid into the second vessel comprises expanding the second deformable region to a second height offset above the third region and corresponding to the degree of deformation.

17. The method of claim 11, further comprising detecting a duration of the input; wherein displacing fluid from the first fluid vessel comprises displacing a volume of fluid proportional to the duration of the input; and wherein displacing fluid into the second vessel comprises displacing the second volume of fluid of a volume proportional to the duration of the input.

18. The method of claim 11, wherein displacing the first volume of fluid from the first fluid vessel comprises displacing the first volume of fluid of a volume proportional to the magnitude of the change in pressure.

19. The method of claim 11, wherein displacing the first volume of fluid from the first fluid vessel comprises displacing the first volume of fluid and decreasing pressure in the fluid vessel by a first pressure magnitude; wherein displacing the second volume of fluid into the second fluid vessel comprises displacing the second volume of fluid and increasing pressure in the fluid vessel by a second pressure magnitude proportional to the first pressure magnitude.

20. The method of claim 19, wherein displacing fluid into the second fluid vessel comprises displacing the second volume of fluid and increasing pressure in the fluid vessel by the second pressure magnitude greater than the first pressure magnitude.

21. The method of claim 11, wherein displacing the second volume of fluid into the second fluid vessel comprises displacing the second volume of fluid corresponding to a first ratio in response to the second volume of fluid greater than a threshold volume of fluid and corresponding to a second ratio in response to the second volume of fluid less than a threshold volume of fluid.

\* \* \* \* \*